United States Patent
Seo

(10) Patent No.: US 8,751,964 B2
(45) Date of Patent: Jun. 10, 2014

(54) METHOD AND SYSTEM FOR UPDATING INFORMATION OF INFORMATION PROVIDING SITE

(75) Inventor: Hong Cheol Seo, Seongnam-si (KR)

(73) Assignee: Enuri.com Co., Ltd., Seoul (KR)

( * ) Notice: Subject to any disclaimer, the term of this patent is extended or adjusted under 35 U.S.C. 154(b) by 317 days.

(21) Appl. No.: 12/395,129

(22) Filed: Feb. 27, 2009

(65) Prior Publication Data
US 2010/0023891 A1    Jan. 28, 2010

(30) Foreign Application Priority Data

Jul. 25, 2008 (KR) .................... 10-2008-0073228

(51) Int. Cl.
G06F 3/048 (2013.01)
G06F 15/16 (2006.01)

(52) U.S. Cl.
CPC .............. *G06F 3/048* (2013.01); *G06F 15/16* (2013.01)
USPC .................................. 715/828; 707/4; 705/20

(58) Field of Classification Search
USPC ....................................................... 715/828
See application file for complete search history.

(56) References Cited

U.S. PATENT DOCUMENTS

| 6,076,070 A * | 6/2000 | Stack ................................ 705/20 |
| 2001/0034735 A1* | 10/2001 | Sugiyama .................. 707/104.1 |
| 2008/0091667 A1* | 4/2008 | Nair .................................. 707/4 |
| 2009/0089179 A1* | 4/2009 | Ho .................................. 705/26 |

FOREIGN PATENT DOCUMENTS

| KR | 10-2004-0001312 A | 1/2004 |
| KR | 10-2004-0021790 A | 3/2004 |

* cited by examiner

*Primary Examiner* — Matt Kim
*Assistant Examiner* — Tuan S Nguyen
(74) *Attorney, Agent, or Firm* — The PL Law Group, PLLC

(57) ABSTRACT

A method of updating item information of a specific site on an information providing site is provided. The method includes displaying the specific item information of the specific site, receiving user input for selecting one item among the displayed specific items, and when the selected item information displayed on the information providing site is not the same as the information about the selected item provided on the specific site, updating the selected item information into the information provided on the specific site and displaying the updated information.

9 Claims, 8 Drawing Sheets

| RANKINGS | SHOPPING MALL | PRODUCT NAME | POPULAR PRODUCT INFORMATION RANKINGS | | | |
|---|---|---|---|---|---|---|
| | | | SALE PRICE | DELIVERY COST | MISCELLANEOUS | |
| 1 | SHOPPING MALL A | PRODUCT NAME A | 800,000 won | NO CHARGE | 2% DISCOUNT COUPON | MOVE |
| 2 | SHOPPING MALL B | PRODUCT NAME B | 855,000 won | NO CHARGE | — | MOVE |
| 3 | SHOPPING MALL C | PRODUCT NAME C | 840,000 won | 2,000 won | — | MOVE |
| ○○∞ | ○○∞ | ○○∞ | ○○∞ | ○○∞ | ○○∞ | ○○∞ |

METHOD AND SYSTEM FOR UPDATING INFORMATION OF INFORMATION PROVIDING SITE

CROSS-REFERENCE TO RELATED APPLICATION

This application claims the benefit under 35 U.S.C §119 of Korean Patent Application No. 10-2008-0073228, filed on Jul. 25, 2008, which is hereby incorporated by reference in its entirety.

BACKGROUND OF THE INVENTION

1. Field of the Invention

The present invention relates to a method of updating item information of a specific site on an information providing site.

2. Background of the Related Art

Nowadays, due to the abundance of computers and the development of high-speed telecommunications, the number of Internet users and websites providing a variety of information is steadily increasing. Accordingly, development of the Internet has made it easy to obtain needed information.

In particular, technology for organizing and providing item information that is provided on a plurality sites on a specific information providing site is currently in use.

However, the period with which information on the plurality of sites is updated differs for each site, and the period with which information on the specific information providing site is updated differs so that there is risk of providing incorrect information to users seeking the item information.

Recently, technology for updating item information provided on a plurality of sites into the most recent information on a specific information providing site is being researched.

BRIEF SUMMARY

The present invention is directed to an information update method of an information providing site that updates selected item information into information provided on a specific site when a specific item is selected by user input, and an information update system capable of executing the method.

The present invention is also directed to an information update method of an information providing site that updates information about an item having a set update reservation time into information provided on a specific site at the set reservation time.

According to an aspect of the invention, an information update method of an information providing site displaying specific item information of a specific site includes: displaying the specific item information of the specific site; receiving user input for selecting one item among the displayed specific items; and when the selected item information displayed on the information providing site is not the same as the information about the selected item provided on the specific site, updating the selected item information into the information provided on the specific site and displaying the updated information.

According to another aspect of the invention, an information update method of an information providing site displaying specific item information of a specific site includes: displaying the specific item information of the specific site; setting an information update reservation time for at least one item among the displayed specific items; and updating information about the at least one item having the set information update reservation time into the information provided on the specific site at the set reservation time and displaying the updated information.

According to still another aspect of the invention, an information update system updating specific item information of a specific site includes: an information providing site displaying the specific item information of the specific site; a user terminal for selecting an item among the displayed specific items; and an information extracting server updating the selected item information into information provided on the specific site when the selected item information displayed on the information providing site is not the same as the information about the selected item provided on the specific site and displaying the updated information on the information providing site.

BRIEF DESCRIPTION OF THE DRAWINGS

The above and other objects, features and advantages of the present invention will be more apparent from the following detailed description taken in conjunction with the accompanying drawings, in which:

FIGS. 7 to 8 illustrate states for describing the information update method shown in FIG. 6.

DETAILED DESCRIPTION OF EXEMPLARY EMBODIMENTS

Figure 1:
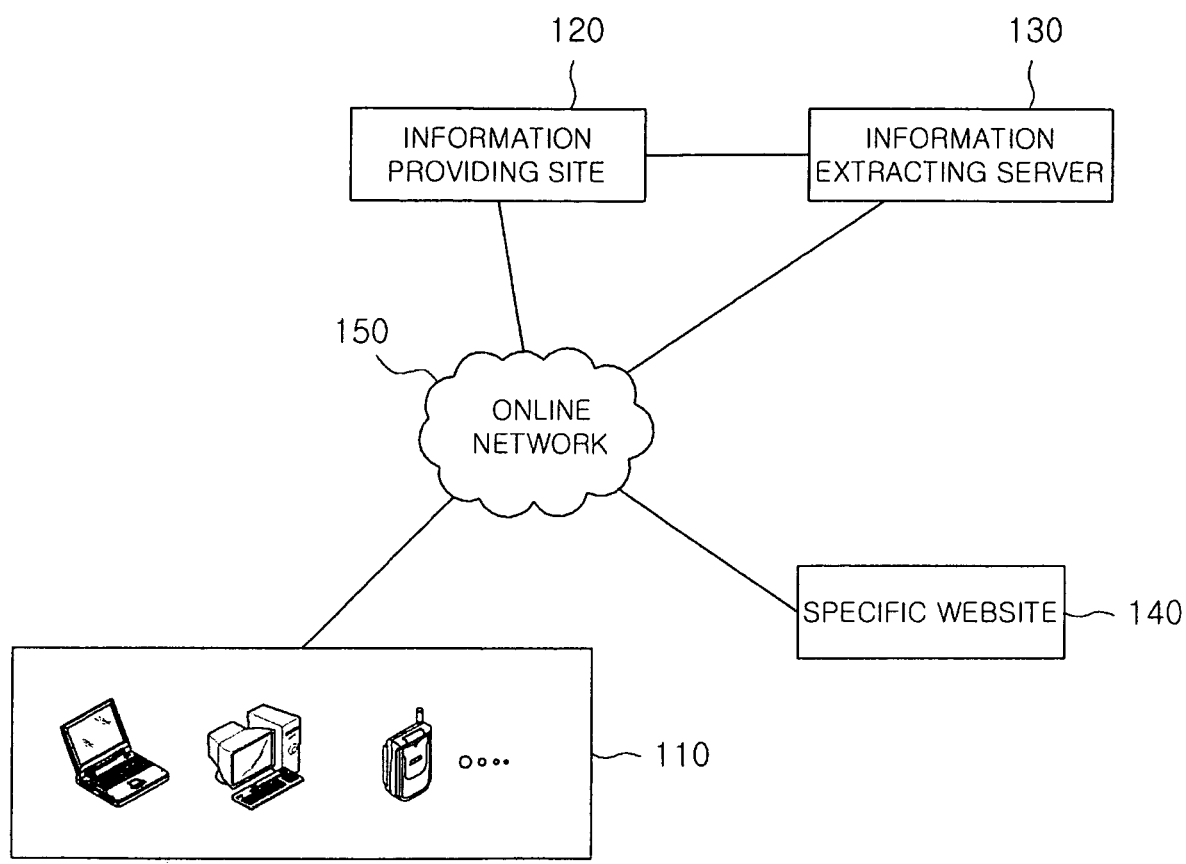
FIG. 1 is a block diagram illustrating an information update method of an information providing site according to an exemplary embodiment of the present invention.

In order to specifically describe the present invention such that it may be made by those skilled in the art, exemplary embodiments of the present invention will now be described in detail with reference to the accompanying drawings. Like reference numerals designate like components throughout the drawings and specification.

An information update method of an information providing site according to an exemplary embodiment of the present invention will now be described with reference to the accompanying drawings.

FIG. 1 is a block diagram of a system performing an information update method of an information providing site according to an exemplary embodiment of the present invention.

The information update system according to an exemplary embodiment of the present invention may include a user terminal 110 connected through an online network 150, an information providing site 120, an information extracting server 130, and a specific website 140. The online network 150 may include at least one of a wired communication network and a wireless communication network. In particular, the online network 150 may include an Internet-based network.

In the description below, the Internet will be taken as an example of the online network 150.

On the specific website 140, information about various items may be provided via the online network 150. For example, information about a specific product, information about a specific service, etc. may be provided. Information about a specific product may include price information about the product, discount information, merchant information, information about delivery in the event of purchase of the product, a name of the product, etc. Also, information about a specific service may include price information about the service, discount information about the price of the service, information about the service provider, etc.

Also, information provided on the specific website 140 may be updated on the website 140 at predetermined time intervals. For example, information may be updated in real-time intervals or it may be updated in intervals of a fixed period set by an administrator of the website 140.

Also, while information provided on the specific website 140 may be directly provided on the specific website 140, it may also be provided through the information providing site 120. In addition, the specific website 140 may include a plurality of sites.

The information providing site 120 may display information about a specific item provided on the specific website 140 based on specific criteria. In this case, the information providing site 120 may be equipped with a database for storing information about a specific item provided on the specific website 140. The specific criteria may include compliance to the specific item, sale price of the item, etc.

The information providing site 120 may extract information about the specific item from the specific website 140, and it may also receive the information from the specific website 140. Also, the specific website 140 may directly upload information about the specific item to the information providing site 120 using File Transfer Protocol (FTP). FTP may be provided by the information providing site 120.

Extraction of information about the specific item may be performed using the information extracting server 130. The information extracting server 130 may operate in connection with the information providing site 120, and it may operate separately from the information providing site 120.

Also, the user terminal 110 may perform communication via the online network 150 (for example, the Internet). For example, the user terminal 110 may be classified as a mobile terminal or a stationary terminal, depending on whether it is mobile. An example of a stationary terminal is a desktop computer.

Also, a mobile terminal may be classified as a portable terminal (or handheld terminal) or a vehicle mounted terminal, depending on whether it can be directly carried around by a user. For example, mobile terminals include mobile phones, smart phones, notebook computers, digital broadcasting terminals, personal digital assistants (PDAs), portable multimedia players (PMPs), navigation systems, MP3 players, etc.

When information about the specific item of the specific website 140 is provided through the information providing site 120, an update period for the specific item may differ between the specific website 140 and the information providing site 120. In this case, the information providing site 120 may update the specific item information to match the information provided on the website 140 and display the updated information.

Figure 2:
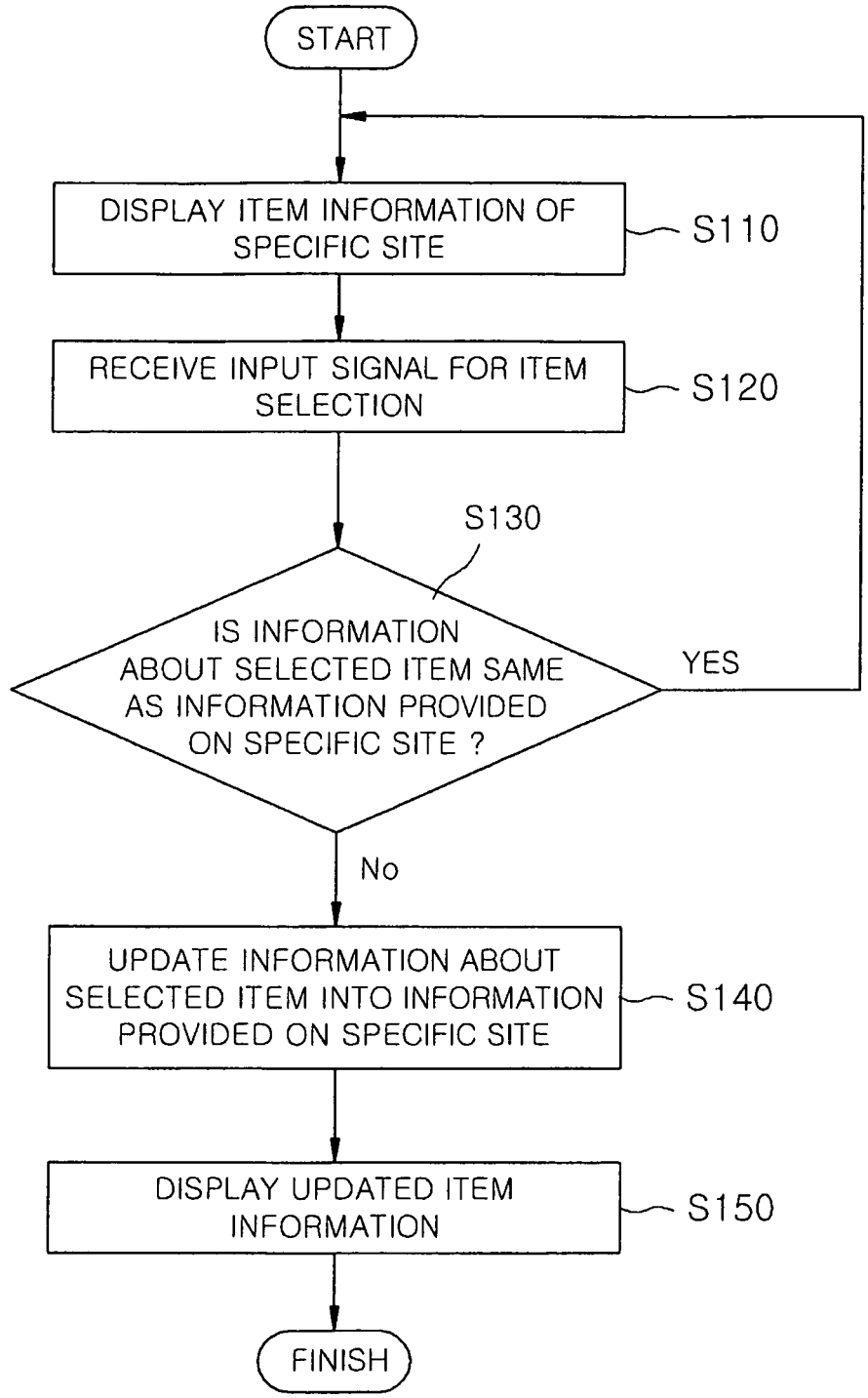
FIG. 2 is a flowchart illustrating an information update method of an information providing site according to an exemplary embodiment of the present invention.

FIG. 2 is a flowchart illustrating an information update method of an information providing site according to an exemplary embodiment of the present invention.

The information providing site 120 may extract or receive information about a specific item from a specific website and display the information (S110). The extracted or received information about the specific item may be stored in a database (not shown) provided in or connected to the information providing site 120. The specific item information may be information about at least one item provided on at least one site. That is, the site from which the displayed item originates may be more than one site, and the specific item may be more than one item.

In this case, a user of the item information may perform an input for selecting any one among displayed specific items using the user terminal 110 (S120). The user input for item selection may be performed in various ways. For example, the user input may include a touch if the user terminal 110 includes a touch screen, and it may include a mouse click if the user terminal 110 is a notebook computer or a desktop computer.

Also, the user may select any one among displayed items in order to check detailed information about the selected item, and he/she may select any one among the displayed items in order to purchase the selected item.

When any one among the displayed items is selected, the information providing site 120 may move a screen displayed on the user terminal 110 to the specific website 140 from which the selected item information originates. Before moving the uniform resource locator (URL) to the specific website 140, the information extracting server 130 may check whether information displayed on the information providing site 120 and information provided on the specific website 140 about the selected item are the same. This may be performed by analyzing a hypertext markup language (HTML) source of the website 140.

When the information displayed on the information providing site 120 and the information provided on the specific website 140 about the selected item are the same, no update procedures with respect to the selected item are performed on the information providing site 120.

However, when the information displayed on the information providing site 120 and the information provided on the specific website 140 about the selected item are not the same, the information extracting server 130 may extract information provided on the specific website 140 about the selected item. The information provided on the specific website 140 may be more recent than the information displayed on the information providing site 120.

In addition, the information about the selected item displayed on the information providing site 120 may be updated into the extracted information (S140). When the information about the selected item is updated, the information providing site 120 may display the selected item information as the updated information (S150). Accordingly, updated information about the item selected by the user is displayed on the information providing site 120.

Meanwhile, according to an exemplary embodiment of the present invention, when the information displayed on the information providing site 120 and the information provided on the specific website 140 about the selected item are not the same, the information providing site 120 may display information for informing the user of the discrepancy.

Using the information update method of the information providing site, information update efficiency may be maximized. For example, items frequently selected by a user are items of frequent transaction, and such items may undergo considerable price fluctuation. Accordingly, by frequently updating information about items whose prices fluctuate widely, information update efficiency may be maximized.

In the following description, information about a product will be taken as an example of information about an item. In addition, a shopping site will be described as an example of a specific website.

Figure 3:
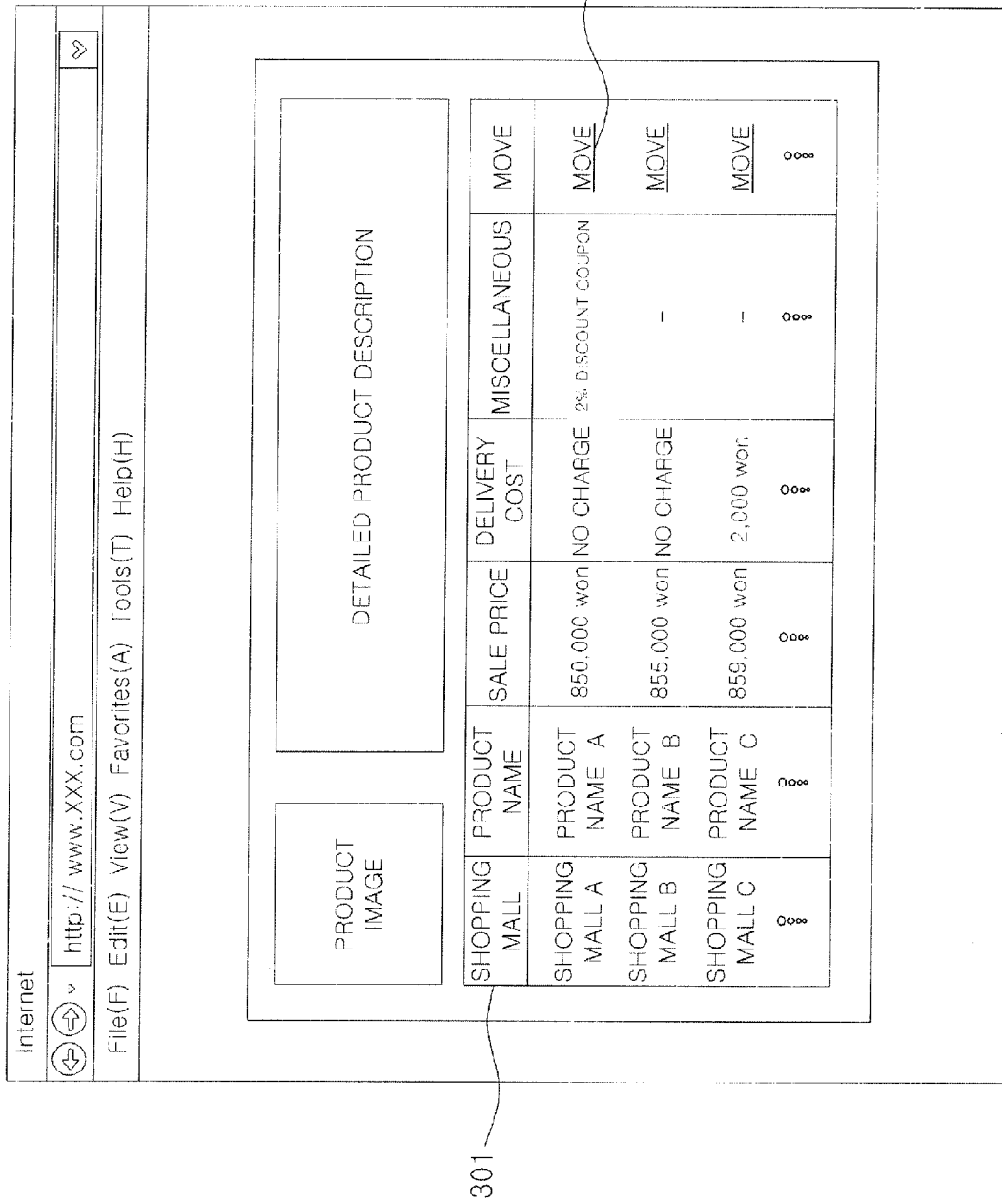
FIGS. 3 to 5 illustrate states for describing the information update method shown in FIG. 2.

FIG. 3 illustrates an example of an information providing site displaying a specific product originating from a specific shopping mall site. In particular, a price comparison site will be described as an example of the information providing site 120.

As illustrated, the information providing site 120 displays an origin of product information and information about the product as a list 301. In the list 301, the name of a site from which the product information originates, product name, sale price, delivery cost information, etc. may be displayed. In this case, when a user purchases "product A" or checks detailed information about "product A", a link item 303 may be input to be connected to shopping mall A. That is, when the link item 303 is received as a user input for selection, a displayed screen switches to the webpage of shopping mall A.

In this case, the information extracting server 130 may determine whether information displayed on the information providing site 120 and information provided on shopping mall A about "product A" are the same. When they are not the same, the information extracting server 130 may extract the information provided on shopping mall A about "product A" and update.

Figure 4:
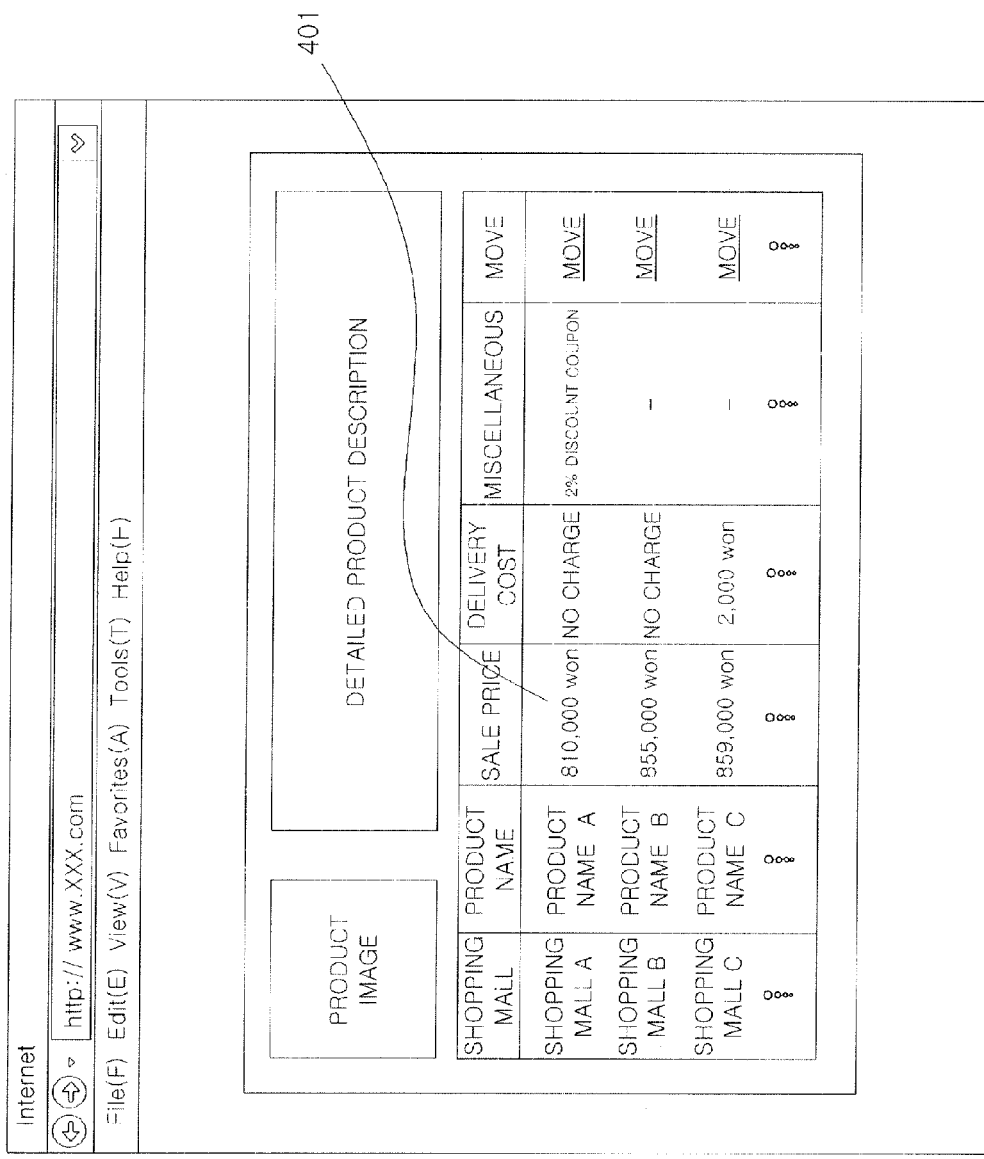

An example of updated information about "product A" displayed on the information providing site 120 is illustrated in FIG. 4. It can be seen that information 401 about the sale price of "product A" has been updated from the information illustrated in FIG. 3.

Figure 5:
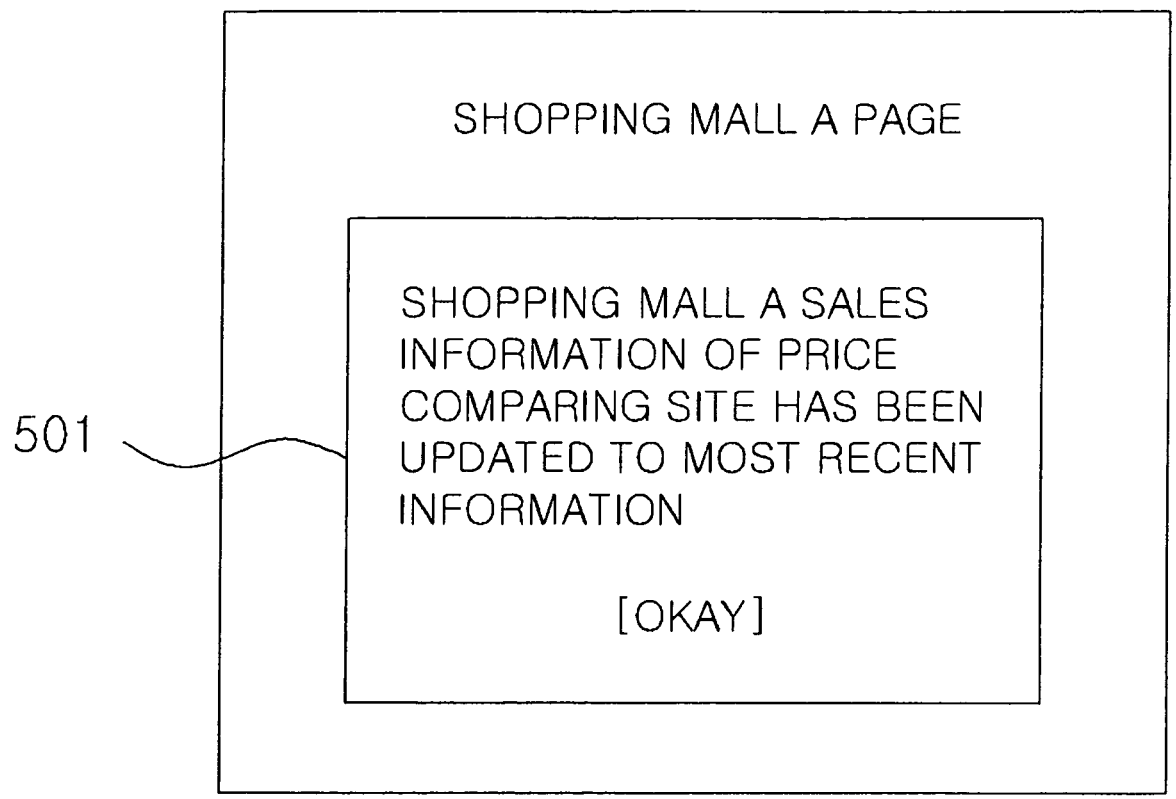

Meanwhile, according to an exemplary embodiment of the present invention, when the information displayed on the information providing site 120 and the information provided on shopping mall A about "product A" are not the same, the information providing site 120 may display information for informing the user of the discrepancy. Such an example is shown in FIG. 5. For example, when information about "product A" is updated due to the information discrepancy, a pop-up window 501 is displayed to enable the user to see the update.

Meanwhile, according to an exemplary embodiment of the present invention, the information providing site 120 may update information about an item having a set information update reservation time at the reservation time without user input regarding the specific item.

Figure 6:
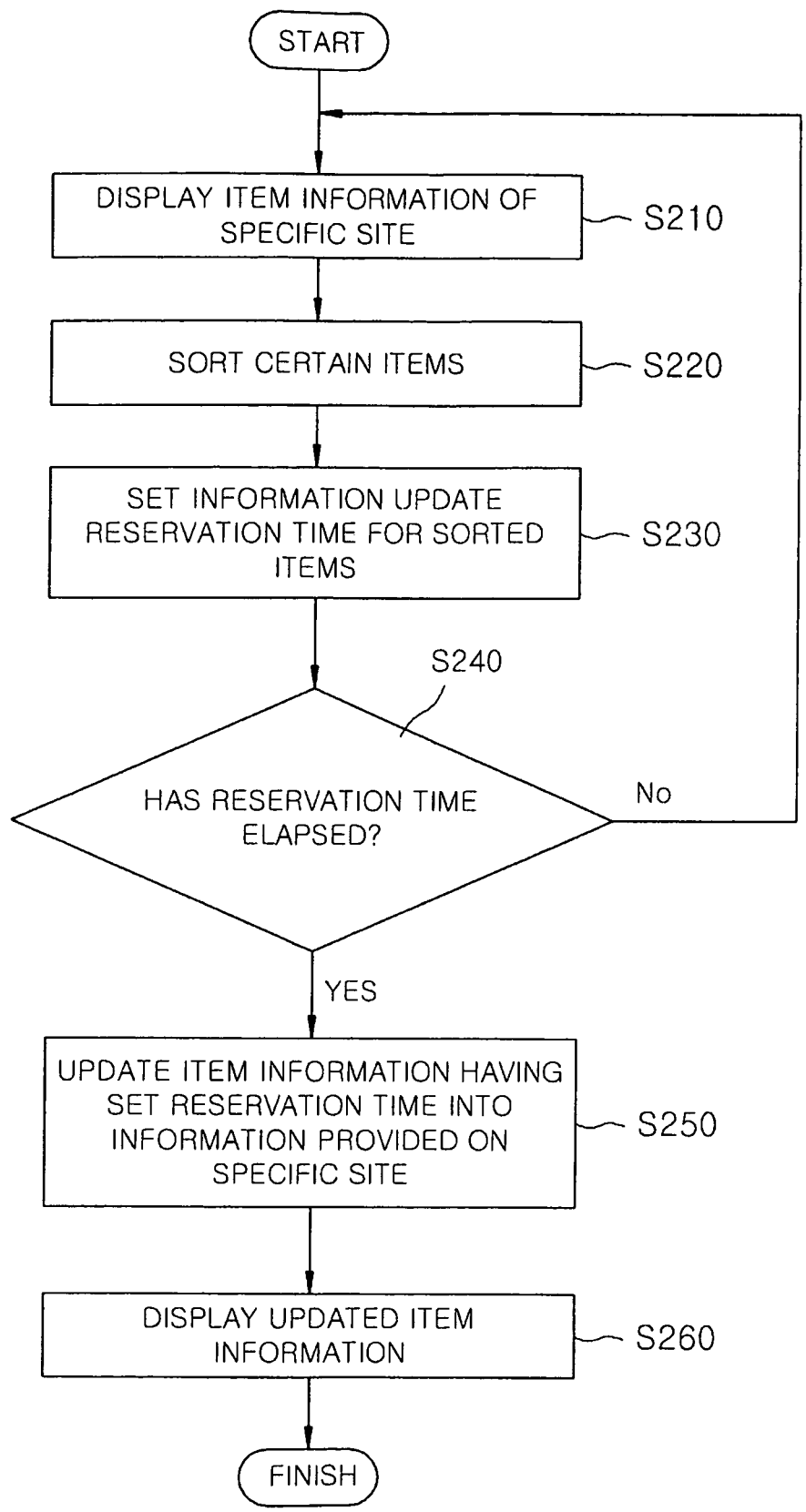
FIG. 6 is a flowchart illustrating an information update method of an information providing site according to another exemplary embodiment of the present invention.

FIG. 6 is a flowchart illustrating a method of updating information by setting a reservation time in an information providing site according to another exemplary embodiment of the present invention.

The information providing site 120 may extract or receive information about a specific item from a specific website and display the information (S210). The extracted or received information about the specific item may be stored in a database (not shown) provided in or connected to the information providing site 120. The specific item information may be information about at least one item provided on at least one site. That is, the site from which the displayed item originates may be more than one site, and the specific item may be more than one item.

In this case, a specific item among displayed items may be selected (S220). The item selection may be performed manually by an administrator of the information providing site 120 or by an automatic selection technique using predetermined information. For example, a predetermined number of items displayed on the information providing site 120 may be selected in order of popularity. The popular items may be determined on the basis of the number of clicks or the number of selections, etc.

A reservation time for updating information about the selected predetermined items may be set (S230). The reservation time may be set by an administrator of the information providing site 120.

When the set reservation time elapses, the information extracting server 130 may determine whether the information displayed on the information providing site 120 and the information provided on the specific website 140 about the selected item are the same. This may be performed by analyzing a hypertext markup language (HTML) source of the website 140 (S240).

When the information displayed on the information providing site 120 and the information provided on the specific website 140 about the selected item are the same, no update procedures with respect to the selected item are performed on the information providing site 120.

However, when the information displayed on the information providing site 120 and the information provided on the specific website 140 about the selected item are not the same, the information extracting server 130 may extract information provided on the specific website 140 about the selected item. The information provided on the specific website 140 may be more recent than the information displayed on the information providing site 120.

In addition, the information about the selected item displayed on the information providing site 120 may be updated into the extracted information (S250). When the information about the selected item is updated, the information providing site 120 may display the selected item information as the updated information (S260).

In the following description, information about a product is taken as an example of information about an item. In addition, a shopping mall site is taken as an example of a specific website.

Figure 7:

FIG. 7 illustrates an example of a list of products arranged in order of popularity being displayed on an information providing site.

The illustrated screen is used for an administrator of the information providing site 120 to manage product information. A popular product list 701 is displayed on the screen. Names of sites from which product information originate, product names, sale prices, delivery cost information, etc. may be displayed in the list 701. Also, check boxes 703 for selecting the products are provided at the left side of the list 701. The administrator of the information providing site 120 may select products for setting an information update reservation time. When a product is selected, the administrator of the information providing site 120 may set an information update reservation time for the selected certain item through a pop-up window 705. For example, after the administrator of the information providing site 120 selects a specific product using the check box 703, when the administrator inputs a key for reserved update through the pop-up window 705 (when "yes" is selected in 705), another pop-up window (not shown) in which a reservation date and time may be input may be displayed.

Meanwhile, according to an exemplary embodiment of the present invention, popular products may be automatically selected based on the number of clicks or the number of selections of an item, etc.

In this way, when a set information update reservation time for a product arrives, the information extracting server 130 may determine whether information displayed on the information providing site 120 and information provided on the specific website 140 about the selected item are the same, and proceed to update information.

FIG. 8 illustrates an example of update of a selected product included in the popular product list shown in FIG. 7. An updated list 801 is illustrated on the screen.

Meanwhile, in an information update method of the information providing site 120 according to an exemplary embodiment of the present invention, the information providing site 120 may update item information of the specific website 140 by the request of an item information provider who uploads item information onto the specific website 140 or by the request of the specific website 140. In the following description, a shopping mall site will be taken as an example of the specific website 140 and a product salesperson will be taken as an example of the information provider.

For example, a product information provider registering his/her personal information with a shopping mall site becomes a member of the information providing site 120 and checks whether his/her personal information registered with the shopping mall site is updated as the most recent information on the information providing site 120 and being provided to customers (product information users). The product information provider may be a shopping mall operator, a product salesperson, etc. In the event that the product information provider confirms that periodic information update procedure or information update procedure by the information extracting server 130 is not being executed and the most recent information is not being provided to customers, he/she may directly log in to the information providing site 120 and request product information update on the information providing site 120. For example, the information provider may input a recognition code identifying the shopping mall site with which his/her personal information is registered and the registered personal information through an interface provided by the information providing site 120. Through this input, information update procedure may be executed by the information extracting server 130 and the personal information registered with the shopping mall site may be updated into the most recent information.

Also, according to an exemplary embodiment of the present invention, the above-described method may be embodied in the form of a computer-readable program code stored on a computer-readable recording medium. The computer-readable recording medium may be any kind of recording device in which data that can be read by a computer system may be recorded. Examples of the recording medium include ROM, RAM, CD-ROM, magnetic tape, floppy disks, optical data storage devices, etc. The recording medium may also take the form of carrier waves (for example, transmission over the Internet).

An information update method and information update system of an information providing site according to an exemplary embodiment of the present invention can update selected item information, when a specific item is selected by user input, into most recent information provided on a specific site to provide the user with more accurate information.

An information update method and information update system of an information providing site according to an exemplary embodiment of the present invention can maximize information update efficiency by frequently updating information about items of frequent transaction based on user selection.

Also, according to an exemplary embodiment of the present invention, by setting an information update reservation time for a certain item, information can be updated at a time desired by an information providing site administrator.

Also, according to an exemplary embodiment of the present invention, since all information displayed on an information providing site is not updated at once but rather only certain selected information is updated, a load on an information providing site server can be reduced.

While this invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

What is claimed is:

1. An information update method of a shopping-related information providing site displaying specific shopping item information of a specific e-commerce site, the method comprising:

displaying, on the shopping-related information providing site, a list comprising at least one shopping item provided on at least one specific e-commerce site, each shopping item provided on each specific e-commerce site being displayed with the specific shopping item information;

receiving user input from a user for selecting one shopping item provided on one specific e-commerce site among the displayed list;

automatically comparing, upon receiving the user input, the displayed specific shopping item information about the selected shopping item with information, corresponding to the displayed specific shopping item information, about selected shopping item provided on the specific e-commerce site at the time the user input is received;

automatically updating the displayed specific shopping item information about the selected shopping item into the information about the selected shopping item provided on the specific e-commerce site at the time the user input is received and displaying the updated information when the displayed specific shopping item information about selected shopping item is not the same as the information, corresponding to the displayed specific shopping item information, about the selected shopping item provided on the specific e-commerce site at the time the user input is received; and displaying information for informing the user of a discrepancy between the information about the selected shopping item displayed on the shopping-related information providing site before the user input is received and the information about the selected shopping item provided on the specific e-commerce site at the time the user input is receive when the information about the selected shopping item displayed on the shopping-related information providing site is not the same as the information about the selected shopping item provided on the specific e-commerce site.

2. The method of claim 1, wherein the displaying the updated information comprises extracting the information about the selected shopping item provided on the specific e-commerce site from the specific e-commerce site.

3. The method of claim 2, wherein the user input for shopping item selection comprises an input for connecting to the specific e-commerce site.

4. The method of claim 1, wherein the information about the selected shopping item provided on the shopping-related information providing e-commerce site comprises at least one of information about a specific product and information about a specific service.

5. The method of claim 1, wherein the specific shopping item information comprise a price of the item.

6. An information update system updating specific shopping item information of a specific e-commerce site, the system comprising:

a shopping-related information providing e-commerce site displaying the specific shopping item information of the specific e-commerce site;

a user terminal for selecting a shopping item among a plurality of displayed specific shopping items; and an information extracting server for automatically comparing, upon a user selecting the shopping item among the plurality of displayed specific shopping items the displayed specific shopping item information about the selected shopping item with information, corresponding to the displayed specific shopping item information, about the selected shopping item provided on the specific e-commerce site at the time the user input is received, automatically updating the displayed specific shopping item information about the selected shopping item into the information about the selected shopping item provided in the specific e-commerce site at the time the user input is received when the displayed specific shopping item information about the selected shopping item is not the same as the information, corresponding to the displayed specific shopping item information, about the selected shopping item provided on the specific e-commerce site at the time the user input is received, and displaying the updated information on the shopping-related information providing site, wherein when the information about the selected shopping item displayed on the shopping-related information providing site is not the same as the information about the selected shopping item provided on the specific e-commence site, the shopping related information providing site displays information for informing the user of a discrepancy between the information about the selected shopping item displayed on the shopping-related information providing site before the user input is received and the information about the selected shopping item provided on the specific e-commerce site at the time the user input is received.

7. The system of claim 6, wherein the information extracting server extracts the information about the selected shopping item from the specific e-commerce site.

8. The system of claim 7, wherein he shopping-related information providing site moves a screen displayed on the user terminal to a screen connected to the specific e-commerce site when any one shopping item is selected via the user terminal.

9. The system of claim 6, wherein the information about the selected shopping item displayed on the shopping-related information providing site comprises at least one of information about a specific product and information about a specific service.

* * * * *